R. H. BURGESS.
SPRING WHEEL.
APPLICATION FILED SEPT. 30, 1907.
924,036.
Patented June 8, 1909.
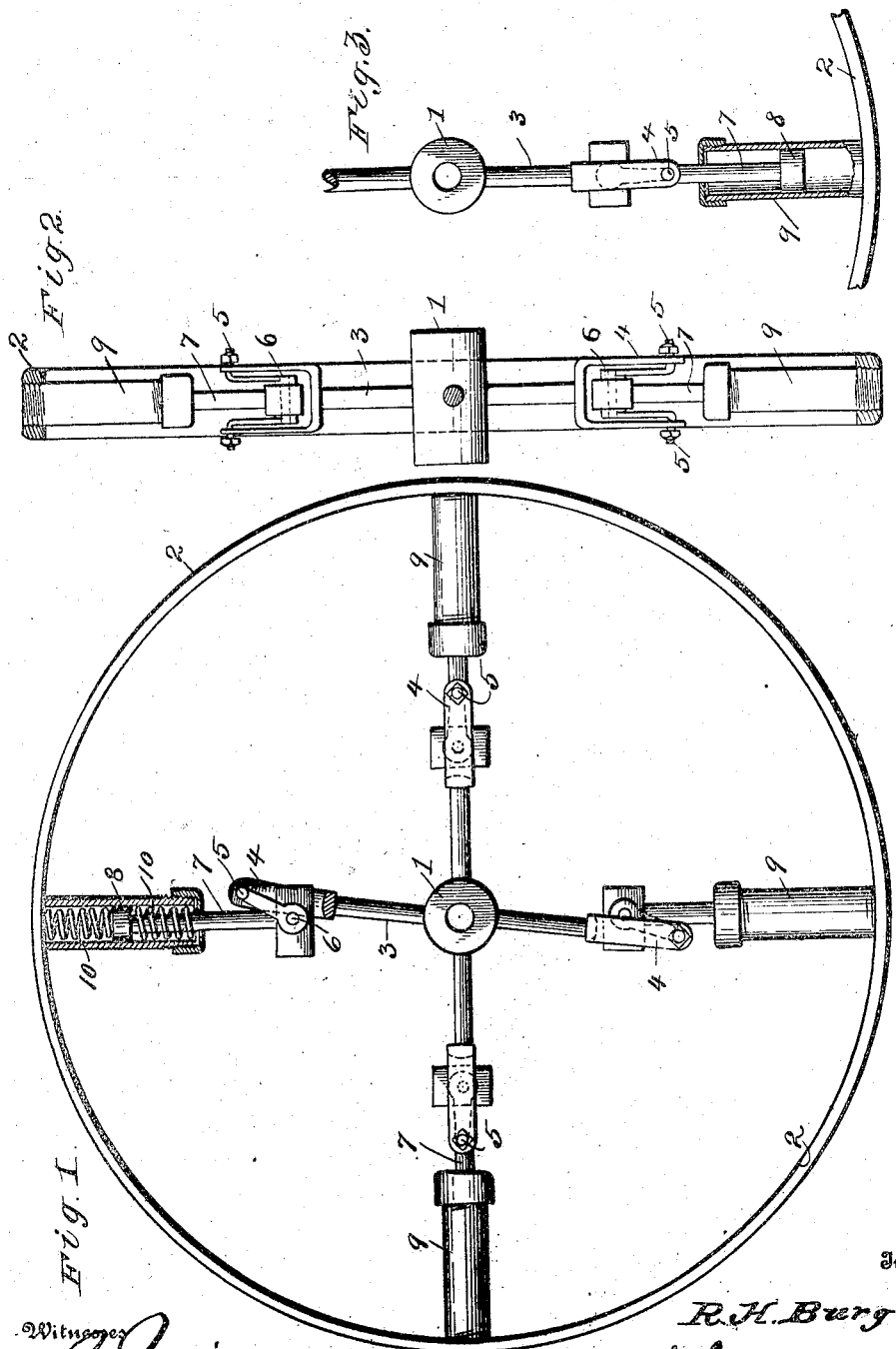

UNITED STATES PATENT OFFICE.

RICHARD H. BURGESS, OF MULLIN, TEXAS.

SPRING-WHEEL.

No. 924,036.  Specification of Letters Patent.  Patented June 8, 1909.

Application filed September 30, 1907. Serial No. 395,251.

*To all whom it may concern:*

Be it known that I, RICHARD H. BURGESS, citizen of the United States, residing at Mullin, in the county of Mills and State of Texas, have invented certain new and useful Improvements in Spring-Wheels, of which the following is a specification.

The present invention relates to certain new and useful improvements in spring wheels and aims to provide a novel construction for absorbing all shocks and jars and preventing the same from being transmitted from the rim to the hub of the wheel.

A further object of the invention is to design a wheel of this character which is of simple and durable construction and comprises few parts to which access can be readily had for repairing if desired.

For a full description of the invention and the merits thereof and also to acquire a knowledge of the details of construction and the means for effecting the result, reference is to be had to the following description and accompanying drawings, in which:

Figure 1 is a side elevation of a spring wheel embodying the invention, portions being shown in section. Fig. 2 is a vertical sectional view through the wheel. Fig. 3 is a plan view of a portion of a wheel showing a modification.

Corresponding and like parts are referred to in the following description and indicated in all the views of the drawings by the same reference characters.

In general a wheel embodying the invention comprises a rim and a hub and spokes connecting the two members, the said spokes being formed in sections having a crank connection with each other, one of the sections being secured to one of the members while the opposite section has a yielding connection with the opposite member.

Referring to the drawing the numeral 1 designates a hub which may be of any approved construction, and 2 a rim. Projecting radially from the hub 1 and preferably rigidly connected thereto are the inner spoke sections 3, the free ends of which are bifurcated as indicated at 4. In the preferred embodiment of the invention four spokes are utilized as will be readily apparent from an inspection of the drawing.

A shaft 5 is journaled between the arms of the bifurcated end 4 of each of the spoke sections 3, the said shafts having crank portions 6 adapted to swing within the bifurcations. Pivotally connected to the crank portion 6 of the shaft is the outer spoke section 7 which is normally disposed in alinement with the inner spoke section and terminates in a piston 8.

Secured to the rim 2 are the tubular casings 9 receiving the pistons 8, cushioning means being provided upon opposite sides of the piston to permit the same to have a yielding movement in either direction. In the embodiment of the invention shown in Fig. 1 coil springs 10 are shown as bearing against opposite sides of the pistons 8, while as shown in Fig. 3 the piston has an air tight connection with the interior of the tubular casing and air is confined on either side thereof, the said air constituting a cushion and acting in a manner similar to that of the springs.

With this construction it will be readily apparent that the hub is permitted to move relative to the rim and that a yielding connection is provided between the two members for the purpose of absorbing the shocks and jars and preventing the same from being transmitted to the vehicle.

Having thus described the invention, what is claimed as new is:

The herein-described spring wheel, comprising a hub, a rim, inner spoke sections projecting radially from the hub and having their outer ends bifurcated, a crank shaft journaled within the bifurcated end of each of the inner spoke sections, an outer spoke section pivotally connected to each of the crank shafts, a piston at the outer end of each of the outer spoke sections, tubular casings projecting inwardly from the rim and receiving the pistons, and cushioning means arranged within the tubular casings and bearing against the pistons.

In testimony whereof I affix my signature in presence of two witnesses.

RICHARD H. BURGESS. [L. S.]

Witnesses:
T. A. LOVELACE,
M. C. KIRKPATRICK.